Feb. 6, 1951   H. R. HARDING   2,540,368
FLARELESS TUBE AND PIPE COUPLING
Filed March 19, 1948

INVENTOR.
HIRAM R. HARDING
BY Howard J. Whelan.
ATTORNEY

Patented Feb. 6, 1951

2,540,368

UNITED STATES PATENT OFFICE 2,540,368

FLARELESS TUBE AND PIPE COUPLING

Hiram R. Harding, Baltimore, Md., assignor of fifty per cent to Harry E. Karr, Baltimore County, Md., and twenty-five per cent to Logan C. Harding, Hopewell, Va.

Application March 19, 1948, Serial No. 15,895

2 Claims. (Cl. 285—122)

This invention refers to pipe fittings and more particularly to those intended to be used for coupling unthreaded tubing with threaded piping, such as standard iron pipe with brass or copper tubing, that does not have flared or funnel end portions.

The customary manner of coupling screw threaded piping with tubing is accomplished through the use of a union having an internal surface bevelled to bind on the flared end of the tubing, when the parts of the union are screwed together. The tubing is flared for the purpose before assembly in the union. The flared end portion is squeezed in between the parts and makes the passage against leakage from the pipes difficult because of erratic contour. The objection to this method of coupling is that it requires the tooling of the tubing to a flared form before it is brought to the place of installation. If the tooling is not done carefully or as fully as required, it produces a flared end that will leak or otherwise make an undesirable joint, when assembled in the union. The making of the flared end is therefore unsatisfactory and at the time expensive because of the extra time and labor required. It also makes the assembly of the union on the tubing more or less difficult because one-half or part of the union has to be slid over the opposite unflared end of the tubing to that where the flared or funnel portion is disposed. The tubing therefore cannot be assembled to a piece of equipment until one-half of the union is so slid over in place on the tubing and made ready for connection to the other half. The result is that the coupling of the conventional type of union takes more time than desirable and places severe strain on the material of the tubing when tightened to prevent leakage.

It is therefore an object of the present invention to provide a new and improved union for piping that will avoid the disadvantages and limitations of the previous art.

Another object of the invention is to provide a new and improved union for coupling piping and tubing that will avoid the need of flared or funnel end portions on the piping or tubing to make them hold securely and be leakproof.

A further object of the herein described invention is to provide a new and improved union for coupling piping and tubing that will be easy to install and bring the free ends of two pipes or tubes together so they may be securely and tightly coupled to one another.

Other objects of the invention will be made evident as it is more fully outlined.

For a better understanding of the invention and the objects thereof, reference is made to the appended drawings: These drawings and the following description detail a particular form of the invention, by way of example, and not as a limitation, and serve to indicate the principles on which the invention is based, while the claims particularly emphasize the scope of the invention.

The drawings show several views of the invention in which Figure 1, is a side view of a union, coupling a piece of screw threaded pipe with a flareless tubing having a smooth unthreaded exterior, with half shown in section to indicate the internal structure of the union;

Similar reference characters refer to similar parts throughout the drawings.

Figure 1:
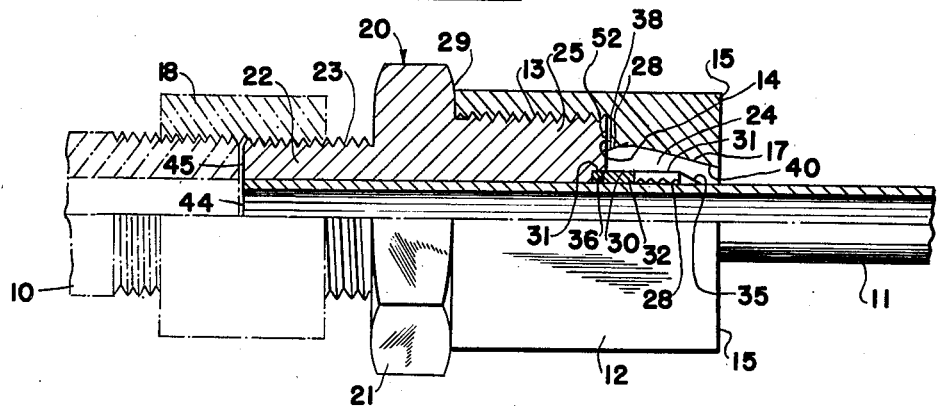
Figure 2:
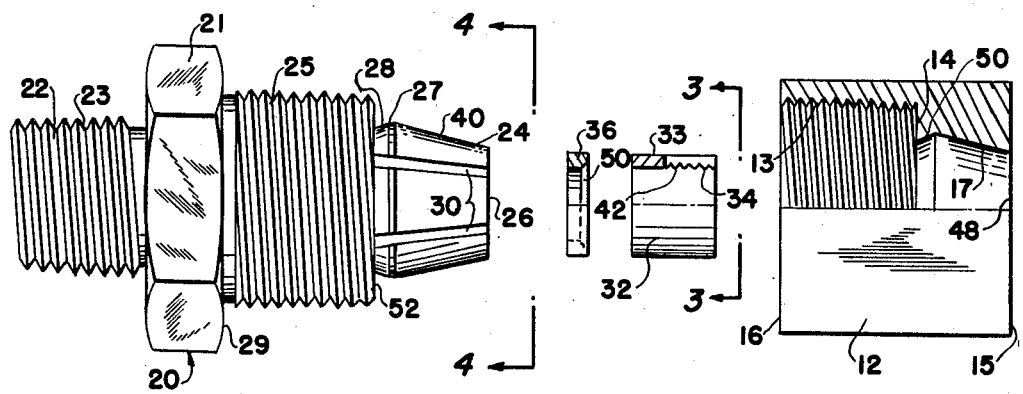
Figure 2 is an exploded view of the elements of the union.
Figure 4:
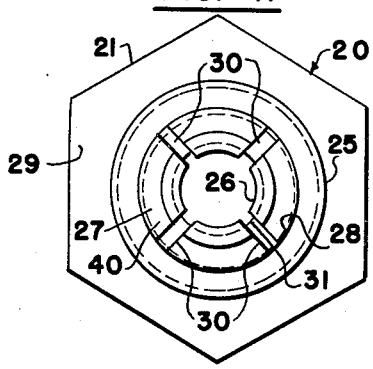
Figure 4 is an end view taken on line 4—4 of Figure 2.
Figure 3:
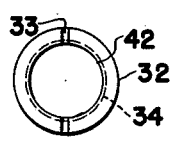
Figure 3 is an end view taken on line 3—3 of Figure 2.

The particular form of the invention indicated in the drawings, is employed for coupling a standard screw threaded pipe 10 to a tubing 11 having smooth squared off end portions. It consists of a union, including a nut shell 12, preferably of a hexagonal exterior form, with an internal straight screw threaded portion 13 of relatively large diameter extending from one end face 16 of the shell to a shoulder 14 interiorly situated and extending downwardly to meet an upwardly tapered inner face 50 that meets a downward angular face 17 then meeting the opposite end face 15. This shell 12 forms a so-called "shell-half" of the union. The other part of the union is termed the plug half 20 of the union and consists of a narrow hexagonal nut element 21 from which an integral axially projecting nipple 22 extends. The latter forming with its exteriorly threaded surface 23, a fitting for insertion in a standard coupling 18 threadedly attached to the pipe 10. An exteriorly threaded nipple 25, large enough to fully screw into the tapped surface 13 of the shell 12, extends axially from the opposite side of the nut element 21. An axially projecting spud 24 is tapered towards its front face 26 for about half its length. The tapered portion 40 of the spud leads into a straight portion 27, which in turn leads into a downwardly projecting angular face 28 which connects with the perpendicular face or shoulder 14 of the element 21. The portion of the spud adjacent the front face 26 has slots 30 long enough to enter longitudinally into the area of the portions 27 and 28 and stop at the face portion 14. These slots preferably numbering four are spaced evenly apart and around the periphery of the spud 24 and provide flexibility to it so it may be pressed resiliently inward. When the plug half 20 is inserted in the shell 12 and screwed onto its threaded surface 13 and its spud 24 is forced into the tapered section 17, its spud wedges therein and its pieces between the slots 30 are forced inwardly. The spud 24 is cylindrically hollowed out to provide an enlarged recess 31 in which a sleeve 32 may be removably disposed. This sleeve has slots 34 through its wall 33 to permit it to be inwardly converged under pressure. The interior diametral surface 42 of the sleeve is formed with V-like ridges or serrations 34 in a portion of its length to grip the tube 11. The enlarged recess 31 of the spud 24 is inwardly ledged or tapered at 35 to hold the sleeve 32 in place after it has been forced into the recess 31 of the spud and also presses the tapered portion 35 of the sleeve inwardly against a gasket 36 and causes same to bind on the tube 11. The internal diameter of the sleeve 32 as well as that of the nipples 22 and 25 is such as to fit loosely about the exterior surface of the tubing 11, so the latter may be slid therein during its assembly thereto.

The manner of using the union will clarify its operation and functions. The pipe 10 with its coupling 18 slid thereon fits on the nipple 22 until it is tight thereon. The tubing 11 is mounted in the nipples 22 and 25 and sleeve 32 with its square end 44 of the tubing 11 and the open mouth of the shell towards the opposite end of the tubing. Then the shell 12 is brought close to the plug half and screwed on to the nipple 25. The tubing 11 is forced up further into the plug half until its end 44 is flush or nearly flush with the end 45 of the nipple 22. The shell 12 is screwed onto the nipple 25 threads until the tapered surface 17 presses against the tapered surface 40 of the spud 24 between the slots 30 inwardly. The spud in turn pressing inwardly transmits the pressure to the sleeve 32 through the contacting of the tapered face 35 with the end of the sleeve 32 and this by reason of the slots 34, is pressed inwardly so its ridges 42 engage forcibly into the exterior wall of the tubing and tightly close on it. The further the shell half is screwed onto the plug half, the tapered inner face 50 slides over the straight portion 27 and "snaps" down on the angular face 28 and allows the face 16 to be tightened against the face 29 to prevent the shell 12 from loosening on the nipple 25. Also the pressure and movement causes the sleeve 32 to press against the gasket 36 and cause it to tighten up against the tube 11 and add its effect in preventing leakage around the peripheral surface of the tubing. Ample space 38 is provided between the shoulder 14 of the shell and the face 52 to permit considerable adjustment in the screwing of the halves together and thereby provide for a substantial tightening travel to prevent leakage.

The adjustment of the union is made by using wrenches on the hexagonal peripheries of the shell 12 and the element 21 in a conventional working manner. The wrenches are moved in opposite directions to tighten the union, and vice versa to open or unloose it. As the union is tightened the tubing is clamped and wedged on more tightly. The device offers a considerable length of tubing as an obstruction to any leakage. At the same time, this makes the connections between the pipe and tubing stiffer and stronger or more rigid. The effects of vibration are provided against. The coupling of the piping with the union is easily arranged and no twisting of the piping is involved in the process. Since there are no flared ends required in the tubing with this union, that extra work and deformation of the tubing is avoided. The union is not so attached to the piping that it is irremovable, but may be detached at any time when it is desired to do so. This feature also enables the piping to be connected while in place, and there is plenty of room for connecting them even though they are not cut to exact length. The union therefore has considerable flexibility and is of a structure that involves no unusual manufacturing methods in its production. The term as used for tubing and piping is not intended to limit the use of the union to such, in the use of material usually known as these products. It is intended that the union be applicable for use with pipes, tubing or any material used for conveying fluids of all kinds, and interconnect them indiscriminately together without necessarily being of the same material or nature as well as being usable for solid rods.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims:

Having thus described the invention, what is claimed is:

1. A coupling for connecting a threaded pipe with an aligned, spaced, unthreaded metallic tubing, comprising a union member having a nut element substantially midway of its length and integral therewith, a threaded nipple element on one side of said nut element adapted to abut the threaded end of the pipe and a threaded nipple element on the opposite side of said nut element, said union member having a cylindrical opening, lengthwise thereof, adapted to receive the unthreaded tubing, means for securing the threaded end of the pipe to the adjoining threaded nipple element comprising an internally threaded coupling, and means for securing the unthreaded tubing to said union, said means comprising a hollow shell threaded to the other threaded nipple element, and a contractible member between said shell and the tubing adapted to bite into said metallic tubing.

2. A coupling for connecting a threaded pipe with an aligned, spaced, unthreaded metallic tubing, comprising a union member having a nut element substantially midway of its length and integral therewith, a threaded nipple element on one side of said nut element adapted to abut the threaded end of the pipe and a threaded nipple element on the opposite side of said nut element, said union member having a cylindrical opening, lengthwise thereof, adapted to receive the unthreaded tubing, means for securing the threaded end of the pipe to the adjoining threaded nipple element comprising an internally threaded coupling, a shell, having a chamber at one end thereof and screw threads at the opposite end for screwing on the other nipple element, a contractible member in said chamber around the tubing having outer cam faces cooperating with the inner face of said chamber, and a ring element, on said tubing and within said contractible member, said ring element having serrations to engage and bite into the periphery of the metallic tubing, whereby said shell may be threaded on its associated nipple to force contraction of the contractible member and enforce engagement of the serrations on the ring element with the tubing.

HIRAM R. HARDING.

REFERENCES CITED

The following references are of record in the file of this patent:

UNITED STATES PATENTS

| Number | Name | Date |
|---|---|---|
| 115,658 | Tivnan | June 6, 1871 |
| 793,414 | Callanan | June 27, 1905 |
| 1,712,273 | Kennedy | May 7, 1929 |
| 2,351,363 | Parker et al. | July 13, 1944 |
| 2,412,664 | Wolfram et al. | Dec. 17, 1946 |
| 2,455,667 | Franck | Dec. 7, 1948 |

FOREIGN PATENTS

| Number | Country | Date |
|---|---|---|
| 859,875 | France | Dec. 31, 1940 |